(12) United States Patent
Zhao et al.

(10) Patent No.: US 7,684,805 B2
(45) Date of Patent: *Mar. 23, 2010

(54) SYSTEMS AND METHODS FOR FACILITATING INSTANT COMMUNICATIONS OVER DISTRIBUTED CELLULAR NETWORKS

(75) Inventors: Wen Zhao, Kanata (CA); Xin Jin, Nepean (CA)

(73) Assignee: Research In Motion Limited, Waterloo, Ontario (CA)

( * ) Notice: Subject to any disclaimer, the term of this patent is extended or adjusted under 35 U.S.C. 154(b) by 1183 days.

This patent is subject to a terminal disclaimer.

(21) Appl. No.: 10/992,339

(22) Filed: Nov. 19, 2004

(65) Prior Publication Data

US 2005/0128997 A1 Jun. 16, 2005

Related U.S. Application Data

(60) Provisional application No. 60/523,466, filed on Nov. 19, 2003.

(51) Int. Cl.
*H04W 40/00* (2006.01)

(52) U.S. Cl. .................. 455/448; 370/349; 370/352; 455/410; 455/462; 455/465; 455/518; 455/520

(58) Field of Classification Search ............. 370/349, 370/352; 455/410, 448, 462, 465, 518, 520
See application file for complete search history.

(56) References Cited

U.S. PATENT DOCUMENTS

| 5,912,882 | A | * | 6/1999 | Yafuso et al. | 370/270 |
|---|---|---|---|---|---|
| 6,256,733 | B1 | | 7/2001 | Thakkar et al. | |
| 6,363,258 | B1 | | 3/2002 | Schmidt et al. | |
| 6,449,491 | B1 | | 9/2002 | Dailey | 455/518 |
| 2002/0061761 | A1 | | 5/2002 | Maggenti et al. | |
| 2003/0016632 | A1 | | 1/2003 | Refai et al. | 370/260 |
| 2003/0056093 | A1 | | 3/2003 | Huitema et al. | |
| 2003/0129956 | A1 | * | 7/2003 | Virolainen | 455/306 |
| 2003/0139180 | A1 | * | 7/2003 | McIntosh et al. | 455/426 |
| 2003/0153339 | A1 | | 8/2003 | Crockett et al. | |
| 2004/0202117 | A1 | | 10/2004 | Wilson et al. | |
| 2005/0287997 | A1 | * | 12/2005 | Fournier | 455/415 |

FOREIGN PATENT DOCUMENTS

WO WO 01/67674 A2 2/2001

OTHER PUBLICATIONS

Architecture V1.1.0; Push-to-Talk over Cellular (PoC); Architecture; PoC Release 1.0, Aug. 2003.
Push-to-Talk over Cellular Requirements Version 1.0/2004; Open Mobile Alliance; OMA-RD_PoC-V1_0-20040-C.

(Continued)

*Primary Examiner*—Patrick N Edouard
*Assistant Examiner*—Shantell Heiber
(74) *Attorney, Agent, or Firm*—John J. Oskorep, Esq.

(57) ABSTRACT

In instant communications over a wireless network, a user from a private organization sends the request for instant communications communication through a private server controlled by the private organization. The private server sets up a private account with the wireless carrier and the user communicates via the private account.

20 Claims, 8 Drawing Sheets

OTHER PUBLICATIONS

Group Management Requirements; Candidate Version 1.0-Sep. 30, 2004; Open Mobile Alliance; OMA-CP-POC-V1_0-20040930-C.
OMA POC Control Plane, Draft Version 1.0-02004; Open Mobile Alliance; OMA-CP-POC-V1_0-20040-D.
Push-to-Talk over Cellular (PoC); Architecture; Draft Version 1.0—Oct. 2004; OMA-AD_PoC-V1_0-20041005-D.
List Management and Do-not-Disturb V2.0.6 (Jun. 2004); Push to Talk over Cellular (PoC); List Management and Do-not-Disturb; PoC Release 2.0; Comneon, Ericsson, Motorola, Nokia and Siemens.
Architecture V2.0.8 (Jun. 2004); Push-to-talk over Cellular (PoC); Architecture; PoC Release 2.0; Comneon, Ericsson, Motorola, Nokia and Siemens.

* cited by examiner

SYSTEMS AND METHODS FOR FACILITATING INSTANT COMMUNICATIONS OVER DISTRIBUTED CELLULAR NETWORKS

RELATED APPLICATION

This application claims the benefit of U.S. Provisional Application No. 60/523,466 filed Nov. 19, 2003.

TECHNICAL FIELD

The patent application relates generally to Systems and methods for facilitating instant communications over distributed networks, for example Push-to-Talk™ over Cellular (PoC).

DESCRIPTION OF THE RELATED ART

Network delivered instant communications, often in half-duplex manner, such as those provided by PoC architectures for example, provide wireless devices with the ability to communicate with each other in an instant manner, much like walkie-talkies, but over a network.

Referring to FIG. 1, there is shown a conventional PoC architecture defined by 3GPP standards bodies for implementing half-duplex instant communications. The specification under development from the Open Mobile Alliance is: OMA-AD_PoC-V1_0-20031017-D and OMA-AD_PoC-V1_0-20041005-D. Both of these specifications are incorporated herein by reference in their entirety. In the conventional architecture, the components comprising the PoC architecture are located within the carrier's network or a directly related third-party service provider. A PoC client device 101 is shown accessing a carrier network 100 for half-duplex communication through wireless access network 103. Within the carrier network 100, there is a SIP/IP Core 102. Some of the functions of the SIP/IP Core include routing the SIP signalling between the PoC client devices, authenticating and authorizing PoC users, and charge reporting. The carrier network also has Group and List Management Server (GLMS) 104, PoC server 106 and presence server 108. The GLMS server 104 manages groups, contact lists and access lists. The PoC server 106 functions include, among other things, SIP and group session handling, policy control for access to groups, group session control, and access control. The presence server 108 manages presence information and combines various presence-related information into a single presence document.

As shown in FIG. 1, in the conventional architecture, a POC client 101 of a wireless network accesses the PoC functionality through the network's POC server 106, the network's SIP/IP core 102 and the network's GLMS 104. The conventional architecture is network operator centric, where a single operator or carrier runs all necessary components to make the solution function. All identities used for conversations and group chats are publicly available through the carrier's Group and List Management Server (GLMS) 104. Requests for conversations and group chats are made to the carrier's SIP Core 102 using only SIP identities. The ability for latecomers to join a chat session is also supported. These requirements mean that the ability to create PoC sessions is not very private and eavesdropping could become commonplace.

On the other hand, PoC services are limited due to the fact that services are only available within a single wireless carrier. At this time, users belonging to different wireless carriers cannot conduct PoC.

SUMMARY

According to one broad aspect, the application provides a private instant communications processing element for use in conjunction with a first carrier network, the first carrier network providing wireless access to a first plurality of wireless user devices, the first plurality of wireless user devices comprising at least one first private user device, and being configured to route signals from the at least one first private user device to the private instant communications processing element, the private instant communications processing element being adapted to: receive instant communications signals from the at least one first private user device via the first carrier network; perform instant communications signal processing upon the received instant communications signals for the at least one first private user device and to transmit instant communications signals to the at least one first private user device via the first carrier network.

In some embodiments, the private instant communications processing element is further adapted to: assign a generic identifier for the at least one first private user device to be included in a carrier network delivered instant communications session; generate a combined signal for the at least one first private user device to be included in the network delivered instant communications session, and to transmit the combined signal to the carrier network using the generic identifier for inclusion as an input to the network delivered instant communications communication session.

In some embodiments, the combined signal is transmitted to a PoC (push-to-talk over cellular) server within the carrier network where the combined signal is treated as coming from a single user.

In some embodiments, the private instant communications processing element for use in further conjunction with a second carrier network, the second carrier network providing wireless access to a second plurality of user devices, the second plurality of user devices comprising at least one second private user device, and being configured to route signals from at least one second private user device to the private instant communications processing element, wherein the private instant communications processing element is further adapted to: receive signals from the at least one second private user device via the second carrier network; perform instant communications processing on signals received from the at least one first private user device and the at least one second private user device to produce instant communications signals for transmission to the at least one first private user device and to produce instant communications signals for transmission to the at least one second private user device.

In some embodiments, the first plurality of user devices comprises at least one first regular user device, and the second plurality of user devices comprises at least one second regular user device, and the private instant communications processing element is adapted to: assign a first generic user identifier appearing as a single user within a first instant communications session established by the first carrier network and to assign a second generic user identifier appearing as a single user within a second instant communications session established by the second carrier network; combine all second regular user device signals and all first and second private user device signals into a first combined signal and sending the first combined signal to a carrier instant communications processing element of the first carrier network which in turn sends it to first regular user devices via the first carrier network using the first generic identifier; combine all first regular user device signals and all first and second private user device signals into a second combined signal and sending the second combined signal to a carrier instant communications processing element of the second carrier network which in turn sends it to second regular user devices via the second carrier network using the second generic identifier; combine signals from a carrier instant communications processing element of the first carrier network and a carrier instant communications processing element of the second carrier network into a third combined signal and sending the third combined signal to first private user devices via the first network and to the second private user devices via the second network.

In some embodiments, the private instant communications processing element is further adapted to disclose a number of participants behind the first generic identifier to carrier instant communications processing element of the first carrier network for billing purpose.

In some embodiments, the private instant communications processing element is further adapted to provide enhanced security features for the at least one first private user device.

In some embodiments, the instant communications comprises push-to-talk over cellular communications.

In some embodiments, the instant communications comprises half-duplex communications.

In some embodiments, the instant communications comprises instant text messaging.

In some embodiments, the private instant communications processing element comprises a GLMS (group list management server), a presence server and a PoC server.

In some embodiments, the GLMS, the presence server and the PoC server are for connection to the first carrier network through standard interfaces.

According to another broad aspect, the application provides a system comprising: a first carrier network delivering wireless access to regular user devices and private user devices, and comprising a CICP (carrier instant communications processing element) adapted to deliver an instant communications in respect of a plurality of input signals; a PICP (private instant communications processing element) adapted to combine signals from at least one private user device into a combined generic signal for inclusion as one input to an instant communications session delivered by said carrier network.

In some embodiments, the instant communications comprises push-to-talk over cellular communications.

In some embodiments, the instant communications comprises half-duplex communications.

In some embodiments, the instant communications comprises instant text messaging.

In some embodiments, the system further comprises: a second carrier network delivering wireless access to regular user devices and private user devices, and comprising a CICP (carrier instant communications processing element) adapted to deliver instant communications in respect of a plurality of input signals; the PICP (private instant communications processing element) being further adapted to combine signals from at least one private user device into a combined generic signal for inclusion as one input to an instant communications session delivered by said second carrier network.

In some embodiments, the system is adapted to set up an instant communications session by; the PICP receiving a request from one of the private user device containing a user identification and containing invitees comprising other private users and/or regular users; sending the invitation to the invited private network users via the first carrier network; receiving acceptances or rejections of the invitation and adding users to a list of users for the session; assigning a generic identifier for the private users on the session; sending an invitation to regular invitees via the carrier instant communications processing element containing the generic identifier and identifiers of the regular invitees; the carrier instant communications processing element establishing an instant communications session including the generic identifier and the regular invitees that accepted the invitation.

In some embodiments, the system is adapted to set up an instant communications session by: receiving a request from one of the private user devices containing a user identification and containing invitees comprising other private users; sending the invitation to the invited private network users via the carrier network; receiving acceptances or rejections of the invitation and adding users to a list of users for the session.

In some embodiments, the system is adapted to set up an instant communications session by: receiving a request for instant communications, the request comprising an identifier of a user device making the request, and containing invitees comprising a combination of one or more of private users on A (the first carrier network), regular users on A, private users on B (the second carrier network B), and regular users on B; the PICP assigning a first generic identifier to a first carrier network and a second generic identifier to a second carrier network; the PICP sending the invitation to the private users on A and B via appropriate carrier network, receiving the private users acceptances/rejections and adding users to each generic ID accordingly; the PICP sending an invitation to any regular users on A through the CICP of A using the first generic ID; the PICP sending an invitation to any regular users on B through the CICP of B using the second generic ID; the CICP of network A establishing an instant communications session between the regular users on A and a single generic identifier user having the first generic identifier; the CICP of network B establishing an instant communications session between regular users on B and a single generic ID user having the second generic identifier.

According to another broad aspect, the application provides a wireless user device having wireless access via a carrier network, the wireless user device comprising: a regular instant communications client adapted to participate in carrier network delivered instant communications sessions; a private instant communications client adapted to participate in instant communications sessions via the carrier network through a private instant communications processing element.

In some embodiments, the regular instant communications client is a first push-to-talk over cellular client, and the private instant communications client is a second push-to-talk over cellular client.

According to another broad aspect, the application provides a computer readable medium having processor executable instructions stored thereon for execution by a wireless user device, and comprising: a regular instant communications client adapted to participate in carrier network delivered instant communications sessions; a private instant communications client adapted to participate in instant communications sessions via the carrier network through a private instant communications processing element.

Another broad aspect provides a system of providing a PoC communication session including private user devices and regular user devices in which signals of the private users are included in the PoC communication session in a manner that hides identities of the private user devices.

BRIEF DESCRIPTION OF THE DRAWINGS

Embodiments will now be described in greater detail with reference to the accompanying diagrams, in which.

DETAILED DESCRIPTION OF THE DRAWINGS

It would be advantageous to have privacy and security for half-duplex communications services such as PoC provided to corporate users. Corporations may also benefit from cross-carrier service and roaming for their traveling employees and a consistently available solution when their employees are under multiple carriers of wireless services. The current architectures for instant communication over wireless networks, such as Push-to-Talk™ over Cellular (PoC), do not address the corporate requirement for security, privacy and coverage. Furthermore, in the current definition for PoC there are no inter-connection links. PoC components are isolated from both other carriers and from the private or corporate organization.

Similar limitations exist for other instant communications technologies. By "instant communications", it is meant technologies such as Push-to-talk that allow the exchange of communications in a substantially instantaneous fashion. Other examples include instant text messaging.

Figure 1:
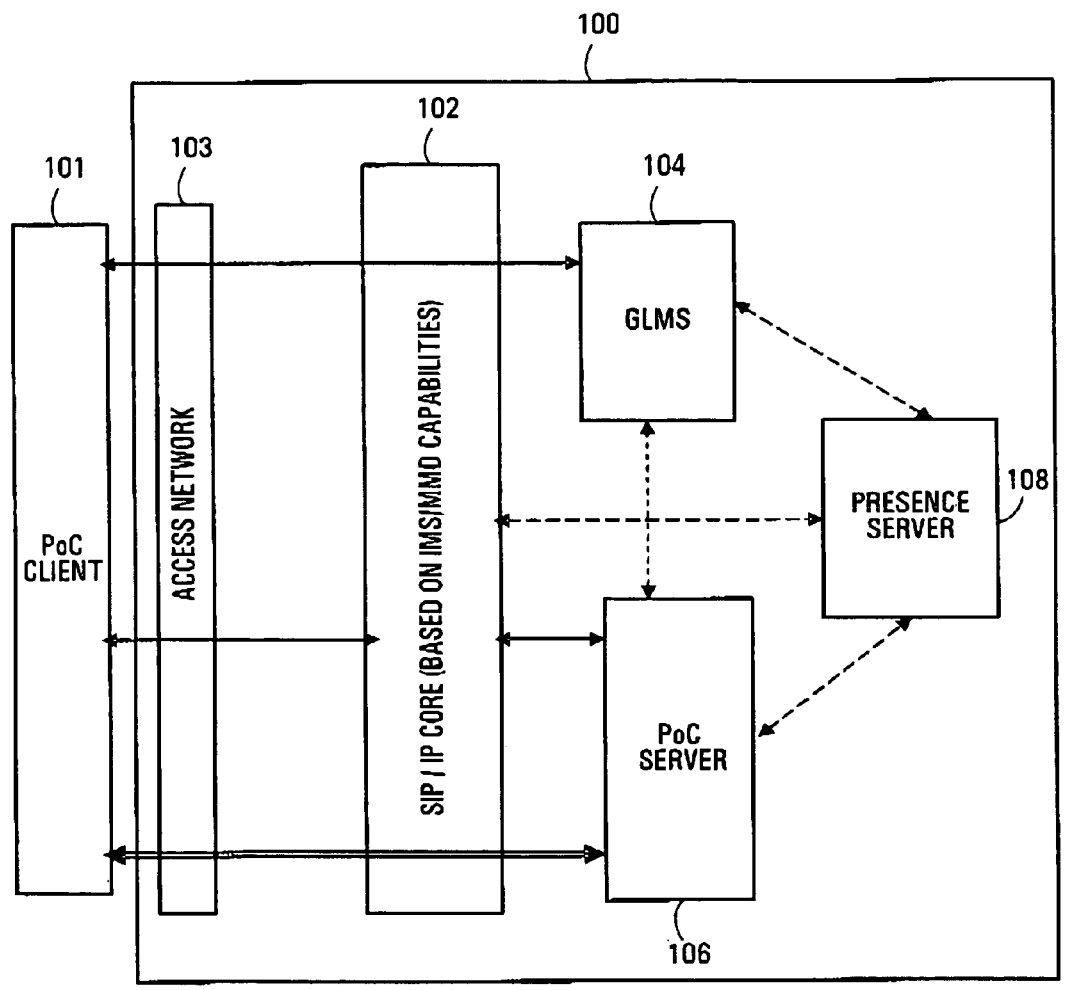
FIG. 1 is a block diagram of a conventional PoC architecture defined by the 3GPP standards bodies for implementing PoC.
Figure 2:
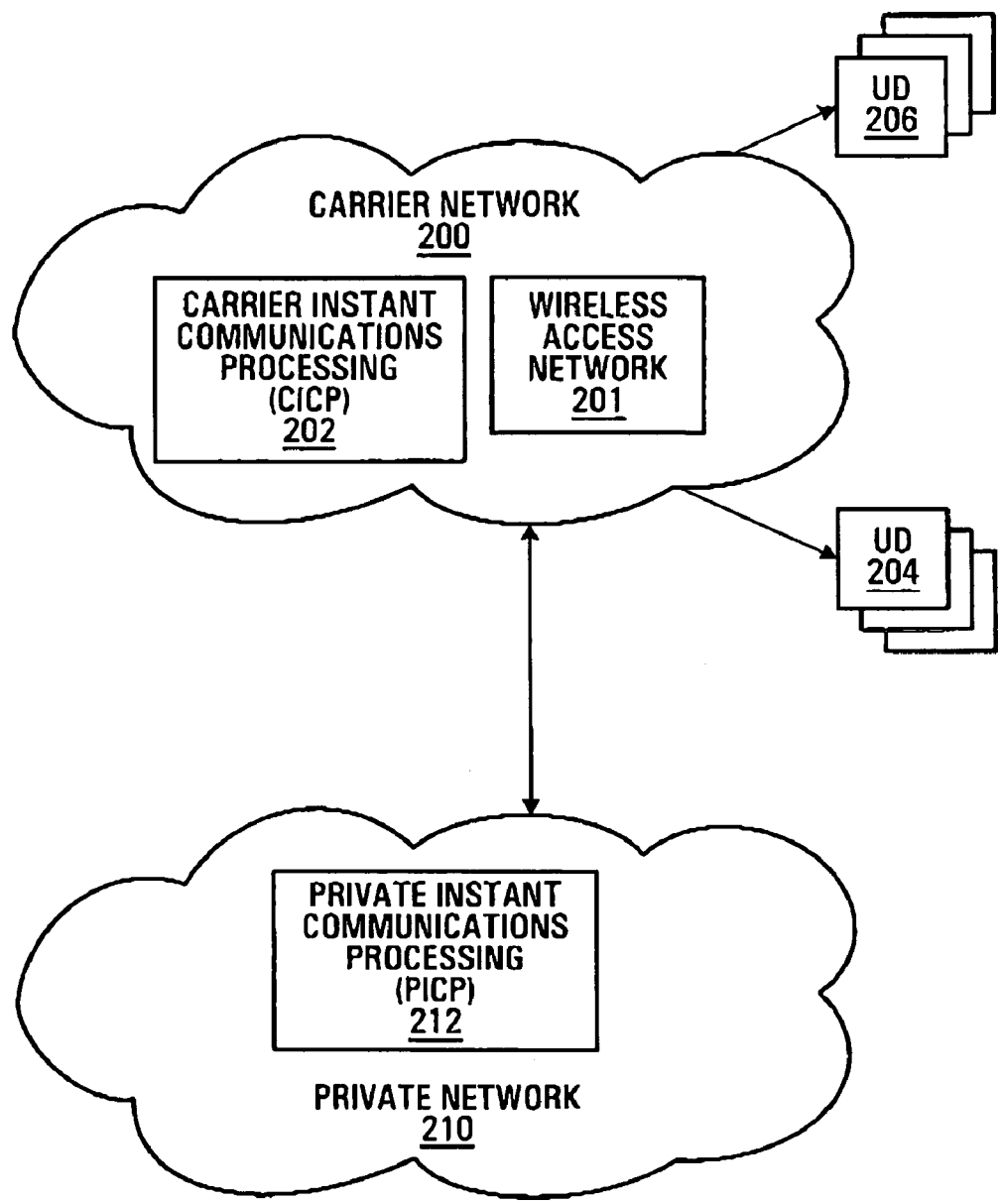
FIG. 2 is a block diagram of a first system for providing instant communications services including providing authentication for corporate users.

FIG. 2 shows an architecture disclosed in general terms. A carrier network 200 is shown. The carrier network has wireless access network functionality 201 and CICP (carrier instant communications processing element) 202 generally representing any functionality within the carrier network that participates in the delivery of network provided instant communications. Also shown is a private network 210 that might be operated by a private organization for example. The private network 210 includes PICP (private instant communications processing element) 212 that allows the private network 210 to participate in providing instant communications.

A set of regular instant communications wireless user devices are indicated at 206. A "regular instant communications wireless user device" is a device equipped to function as a regular instant communications client. Instant communications functionality is provided to these clients in a normal manner by the carrier instant communications processing 202. Also shown is a set of private instant communications wireless user devices 204 associated with the private network 210. A private instant communications device is a device equipped to function as a private instant communications client. Instant communications are provided to the private instant communications wireless user devices 204 by the private instant communications processing 212 via wireless access network 201 as detailed below. Typically, the private instant communications user devices are hand-held wireless devices with extra functionalities such as high security applications. The devices may have other normal communications capabilities as well that are not instant communications. Also, a given device may be capable of functioning using multiple different instant communications mechanisms.

In a preferred embodiment, the instant communications consists of half-duplex voice, such as might be delivered in a PoC system, but other instant communications technologies are contemplated. It is expected future evolutions of PoC will be full-duplex, and the solutions described herein will still apply.

It is noted that it is common for user devices to have multiple modes of operation. In some implementations, a given private instant communications user device may also have modes of operation that allow it to operate in a similar manner to regular instant communications user devices. In other words, a given user device might be equipped with both the regular instant communications client and the private instant communications client. Such a device might switch between being a regular instant communications user device and a private instant communications user device dynamically. Such a device would have two user identifiers—one for regular use and one for private use. Such a user could then initiate/participate in a regular instant communications session that would be processed by the CICP in a normal manner, or could initiate/participate in the private type of instant communications described below.

FIG. 2 shows the functionality of a single private network that allows the delivery of this private type of instant communications to users associated with that network. More generally, multiple private networks, each with an associated set of private user devices may be each connected to the carrier network as described so as to provide this different type of instant communications to their users. Typically a set of private user devices will be associated with some distinct organization.

By way of overview, in operation, instant communications received from private user devices 204 are routed by the wireless carrier network 200 to the private instant communications processing 212 in the private network 210. These are processed by the PICP 212, and a single combined input is generated and sent back to the CICP 202 which treats the combined input like a single normal input from a regular user device 206. The combined input is generic in the sense that the individual private users are not identified. CICP then delivers instant communications functionality to a set of users in an otherwise conventional manner, with the combined private users being treated as one user. The manner by which signals are combined will be technology dependent. For instant text messaging, "combining" simply involves modifying each text message from any private user device so that it appears to be coming from the generic user. For half-duplex voice (such as current PoC implementations) combining involves taking a single active input from any one of the private user devices and transmitting under the generic user ID. There will only be one active input at a time. For full-duplex voice, combining involves combining all of the active inputs from private user devices into a single signal. Preferably, for PoC implementations, the signal combining function is a PoC server.

A first method by which the arrangement of FIG. 2 can be used to provide private instant communications functionality will now be described with reference to the flowchart of FIG. 3. When a user of a private user device 204 wishes to conduct instant communications, a request is generated by the first user device 204 at step 3-1. This request contains some sort of user identification of the user/device making the request, and contains invitees which might include other private users and/or regular users. The request is received by the carrier network 200, for example through wireless access network 201, and the request is addressed to and therefore forwarded on to the PICP 212 at step 3-2. The PICP 212 sends the invitation to the invited private network users via the wireless access network 201 at step 3-3.

The private users' acceptances or rejections of the invitation are received by the wireless access network 201 and forwarded to the PICP 212 and the users are added/not added to a list of users for the session accordingly at step 3-4. At step 3-5, the PICP 212 assigns a generic ID to the set of private users on the session. The generic ID is associated with the private network, but not with any particular user. The PICP then generates an invitation to the CICP at step 3-6. This contains the generic ID and IDs of the regular invitees. The CICP forwards the invitation to regular invitees and receives acceptances/rejections at step 3-7. The CICP then establishes a group instant communications session including the generic ID and the regular invitees that accepted the invitation at step 3-8. Then, on an ongoing basis as indicated at step 3-9, all signals from private users are routed to the PICP 212 where they are combined into a single signal from the generic ID which is then forwarded back to the CICP 202 which treats it as a single user. Advantageously, this system allows the identity of individual private users to be hidden. Steps 3-3 and 3-6 may be performed simultaneously.

The generic IDs can be set up ahead of time and are not linked to any particular user's identity.

Alternatively as long as at step 3-2 the PICP got the invitation, and found there exists at least one regular user, a generic user ID can be determined to be necessary for the session, and assigning such an ID can be performed at 3-5 without necessarily associating it to private users at that time. This ID is used to invite the regular users (steps 3-6, 3-7, 3-8) concurrently with activities of 3-4. Eventually at 3-9, at the carrier side, the generic ID represents all private users without individual identities, and at the corporate side each private user sees all other private and regular users through the generic ID. The generic ID is associated with the private network, but not with any particular user on a permanent basis. The PICP then generates an invitation to the CICP at step 3-6. This contains the generic ID and IDs of the regular invitees. The CICP forwards the invitation to regular invitees and receives acceptances/rejections at step 3-7. The CICP then establishes a group instant communications session including the generic ID and the regular invitees that accepted the invitation at step 3-8. Then, on an ongoing basis as indicated at step 3-9, all signals from private users are routed to the PICP 212 where they are combined into a single signal to the generic ID which is then forwarded back to the CICP 202 which treats it as a single user. Advantageously, this system allows the identity of individual private users to be hidden. Steps 3-3 and 3-6 may be performed simultaneously.

The generic IDs can be registered with the carrier network 200 ahead of time and are not linked to any particular user's identity.

A second method by which the arrangement of FIG. 2 can be used to provide private instant communications functionality will now be described with reference to the flowchart of FIG. 4. This embodiment might be implemented to provide group instant communications among private users only. When a user of a private user device 204 wishes to conduct instant communications, a request is generated by the first user device 204 at step 4-1. This request contains some sort of user identification of the user/device making the request, and contains only private network invitees. The request is received by the carrier network 200, for example through wireless access network 201, and the request is forwarded on to the PICP 212 at step 4-2. The PICP 212 sends the invitation to the invited private network users again via the wireless access network 201 at step 4-3.

The private users' acceptances or rejections of the invitation are received by the wireless access network 201 and forwarded to the PICP 212 and the users are added/not added to a list of users for the session accordingly at step 4-4. Then, on an ongoing basis as indicated at step 4-5, all signals from private users are routed to the PICP 212 where they are combined into a single instant communications signal which is then forwarded back to the private users via the wireless access network 201. It is noted that with this embodiment, users from a private organization 210 with this architecture can conduct instant communications with each other regardless of whether or not such a mode of communications is supported by their wireless carrier network 200. Thus, in another implementation, the method of FIG. 4 can be implemented in conjunction with a wireless carrier network not equipped with CICP 202.

Figure 3:
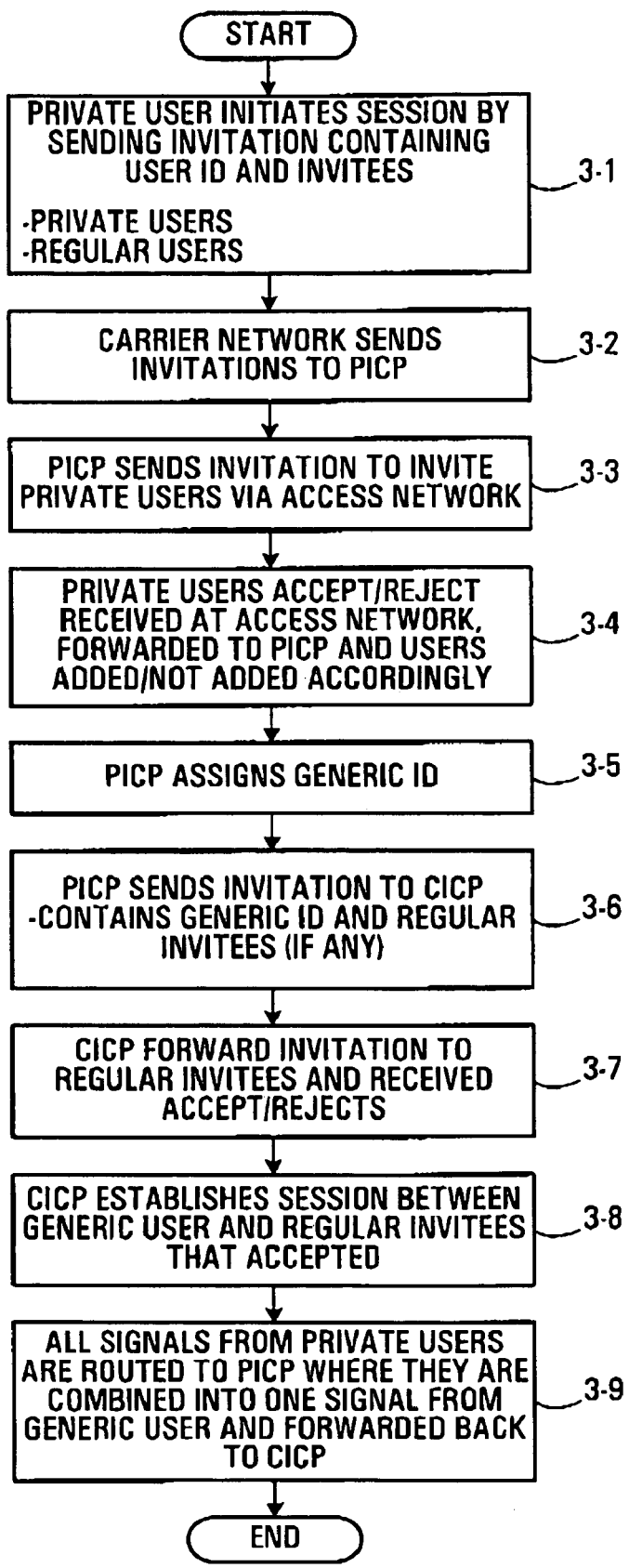
FIG. 3 is a flowchart of a method that might be used with the system of FIG. 2.
Figure 4:
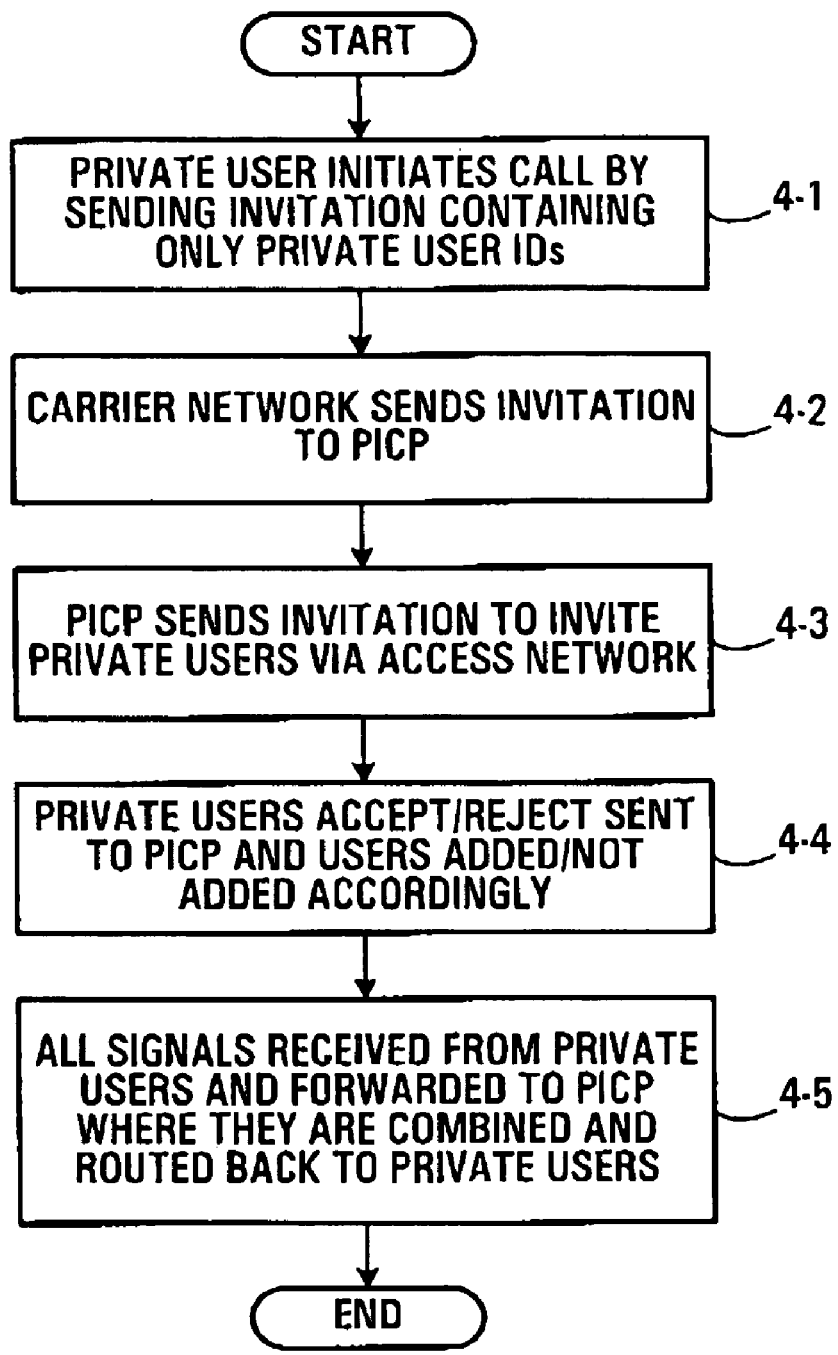
FIG. 4 is a flowchart of another method that might be used with the system of FIG. 2.
Figure 5:
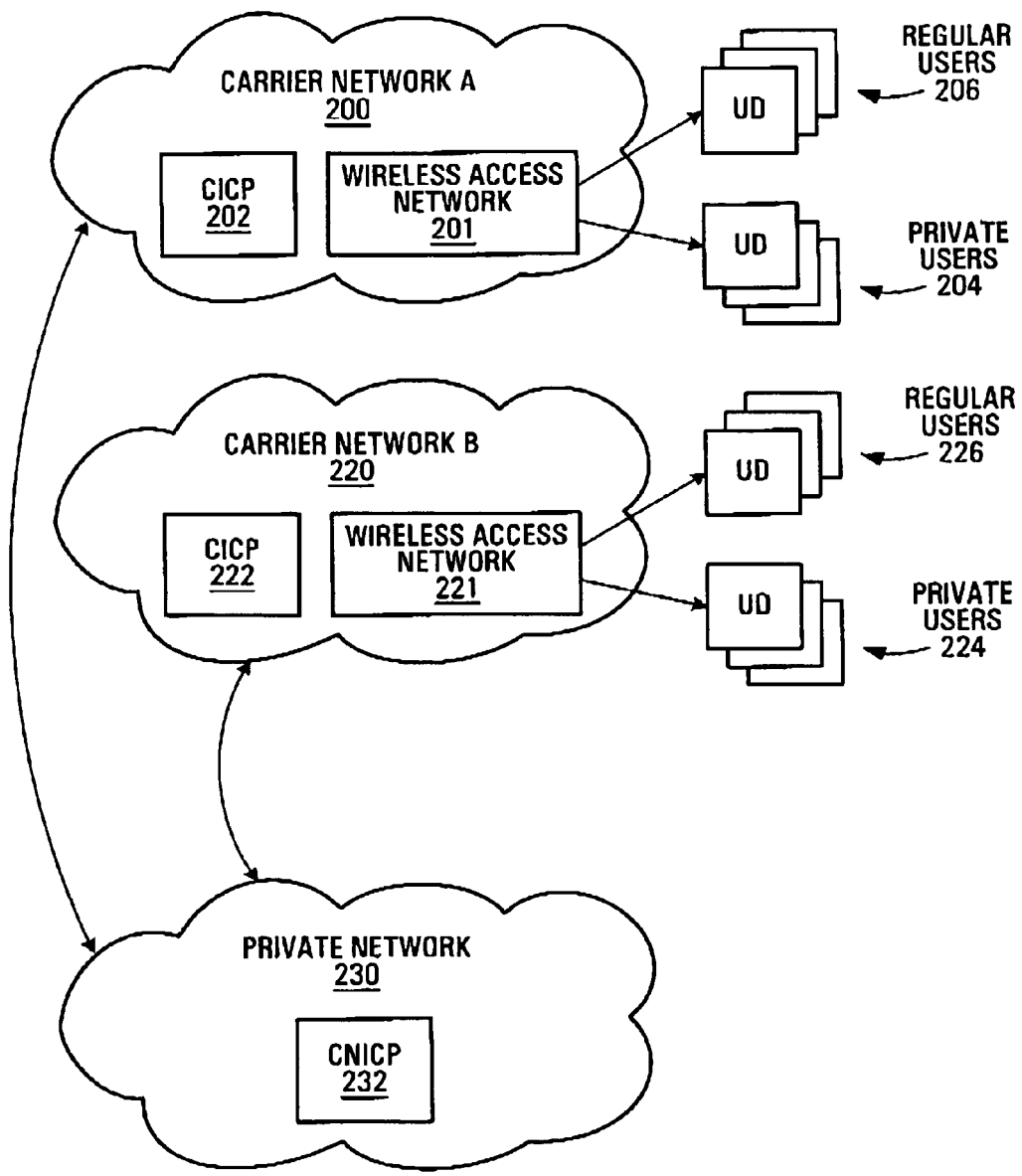
FIG. 5 is a block diagram of another system for providing instant communications services by bridging network carriers.

The embodiments of FIGS. 2-4 have assumed that all the private users are supported by a single carrier network. In another embodiment, private users of a given organization are supported by multiple carrier networks. FIG. 5 depicts a general architecture that supports cross-carrier instant communications. Two carrier networks 200, 220 are shown and these will be referred to as carrier networks A and B respectively. Carrier network A 200 is equipped as before with wireless access network 201 and CICP 202 and provides access to regular user devices 206 and private user devices 204. Carrier network B 220 is similarly equipped with wireless access network 221 and CICP 222 and provides access to regular user devices 226 and private user devices 224. Also shown is a private network 230 equipped with a CNICP (cross-network instant communications processing element) 232, a particular type of PICP.

Figure 6:
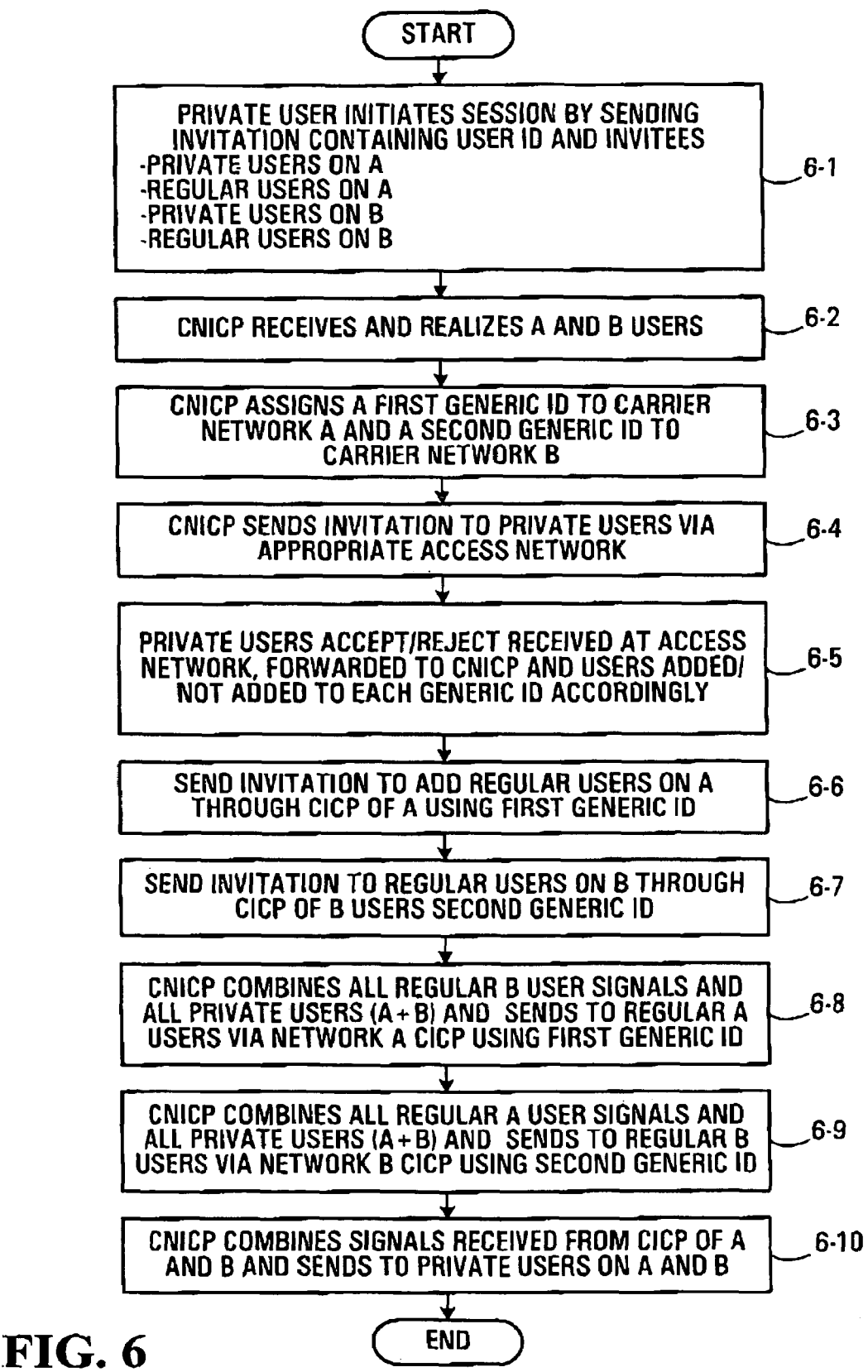
FIG. 6 is a flowchart of a method that might be used with the system of FIG. 5.

Referring now to FIG. 6, shown is a flow chart of a method of providing instant communications using the system of FIG. 5. At step 6-1, a private user initiates a session by sending an invitation. This contains the private user's identifier, and invitees that might include private users on A (carrier network A) regular users on A, private users on B (carrier network B) and regular users on B. Subsets of these four categories may alternatively be present for a given invitation. The invitation is forwarded to the CNICP 232 which in turn realizes that there are both A and B users at step 6-2. At step 6-3, the CNICP 232 assigns a first generic ID to carrier network A and a second generic ID to carrier network B. The CNICP then sends the invitation to the private users on A and B via appropriate access networks at step 6-4. At step 6-5, the private users acceptances/rejections are received at the access networks and forwarded to the CNICP 232, and users are added/not added to the session accordingly. At step 6-6, an invitation is sent from the CNICP 232 to regular users on A through the CICP 202 of A using the first generic ID. At step 6-7, the invitation is sent to regular users on B through the CICP 222 of B using the second generic ID. Steps 6-6 and 6-7 may be performed simultaneously with step 6-4.

At this point, an instant communications session is established. From the perspective of carrier network A CICP, there are the regular A users and a single generic user having the first generic ID that represents all the private users and the users on network B. Instant communications processing is performed by CICP 202 in a normal manner. Similarly, from the perspective of carrier network B CICP, there are the regular B users and a single generic user having the second generic ID that represents all the private users and the users on network A. Instant communications processing is performed by CICP 222 in a normal manner. Private users on A only use the access network 201, and private users on network B only use the access network 221. Steps 6-8, 6-9, 6-10 are then performed on an ongoing basis by the CNICP 232 for the session that is established. At step 6-8, the CNICP 232 combines all regular B users' signals and those of all private users (A and B) and sends this combined signal to regular A users via the network A CICP 202 using the first generic ID. The CICP 202 of network A then treats the combined signal as a single user for the purpose of the instant communications communication with the regular A users.

At step 6-9, the CNICP 232 combines all regular A users' signal with those of all private users (A and B) and sends the combined signal to regular B users via network B CICP 222 using the second generic ID. The network B CICP 222 then receives a single signal and treats this as one user for the instant communications communication with network regular B users.

At step 6-10, the CNICP 232 combines signals from CICP 202 via the first generic ID and CICP 222 via the second generic ID as well as all private users on both networks A and B and sends the combined signal to private users on both networks A and B.

It can be seen how the method of FIG. 6 can be extended to allow the combination of signals from more than just two carrier networks.

Figure 7:
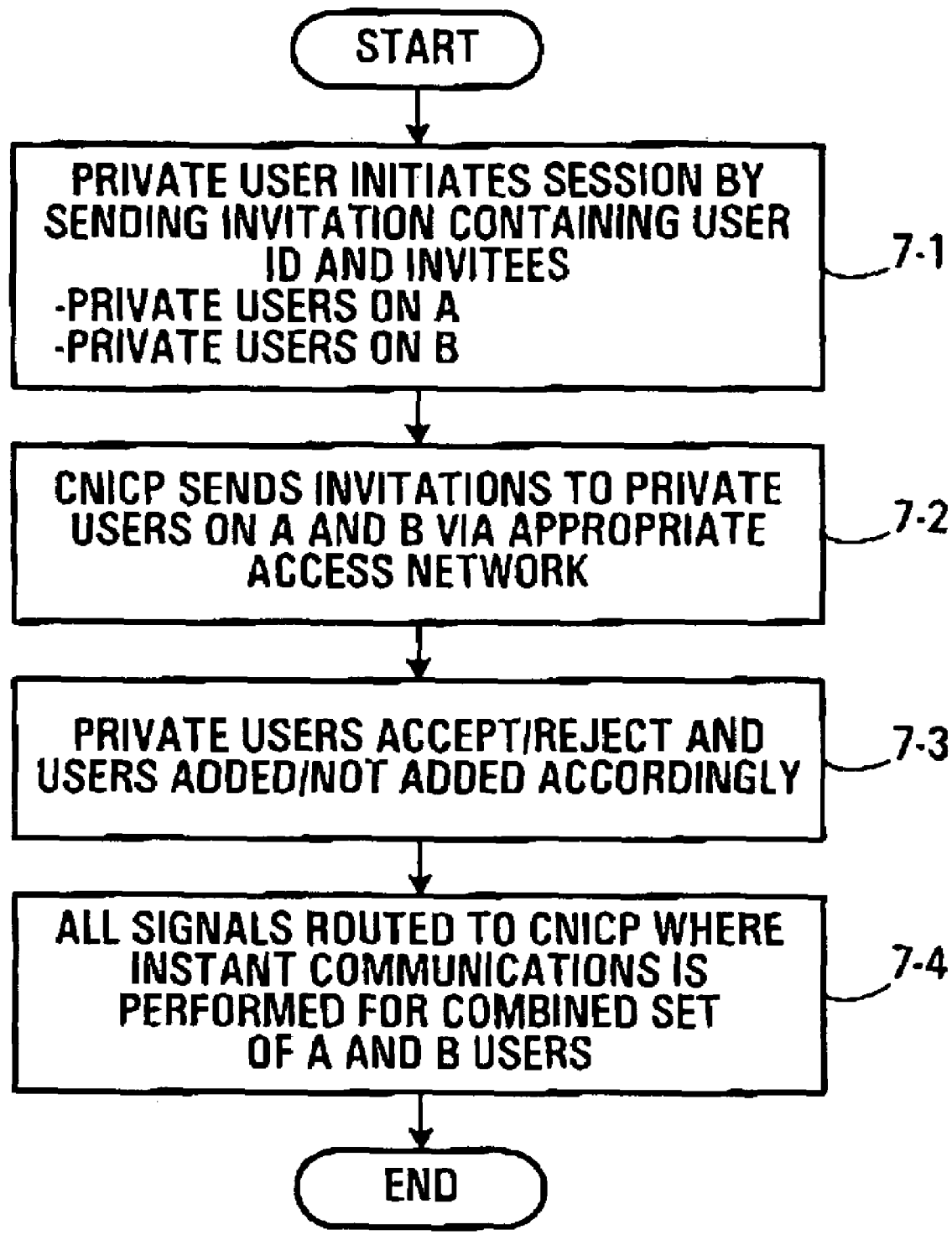
FIG. 7 is a flowchart of another method that might be used with the system of FIG. 5.

In another implementation, a method similar to that of FIG. 6 can be employed to provide cross network instant communications to private user devices connected to carrier networks that do not provide instant communications. Such communications would only be among private user devices. A flowchart of the method is shown in FIG. 7.

The method begins at step 7-1 with a private user initiating a session by sending an invitation. This contains its private user ID and invitees consisting of private users on carrier network A and private users on carrier network B. The invitation is transmitted through to the CNICP 232 which then sends an invitation to the private users on A and B via the appropriate access networks at step 7-2. At step 7-3, the private users accept or reject the invitation, and users are added or not added to the list of users for the session by the CNICP 232. Then, at step 7-4 and on an ongoing basis, all signals are routed to the CNICP 232 where instant communications processing is performed for the combined set of users on A and B. The effect of this is that an instant communications call is set up between private users on carrier network A and private users on carrier network B notwithstanding the fact that the carrier networks A and B may or may not provide any such instant communications capability. Thus, this could be implemented in a network such as shown in FIG. 5, but with the omission or inclusion of one or both of CICP 202 and CICP 222.

With the architecture of FIG. 5 and examples given, cross-carrier instant communications services, are provided that withhold user identities within their specific carriers or corporations, and enables enhanced features within the corporation clients. The features can include improved services that are in the control of the corporation.

Figure 8:
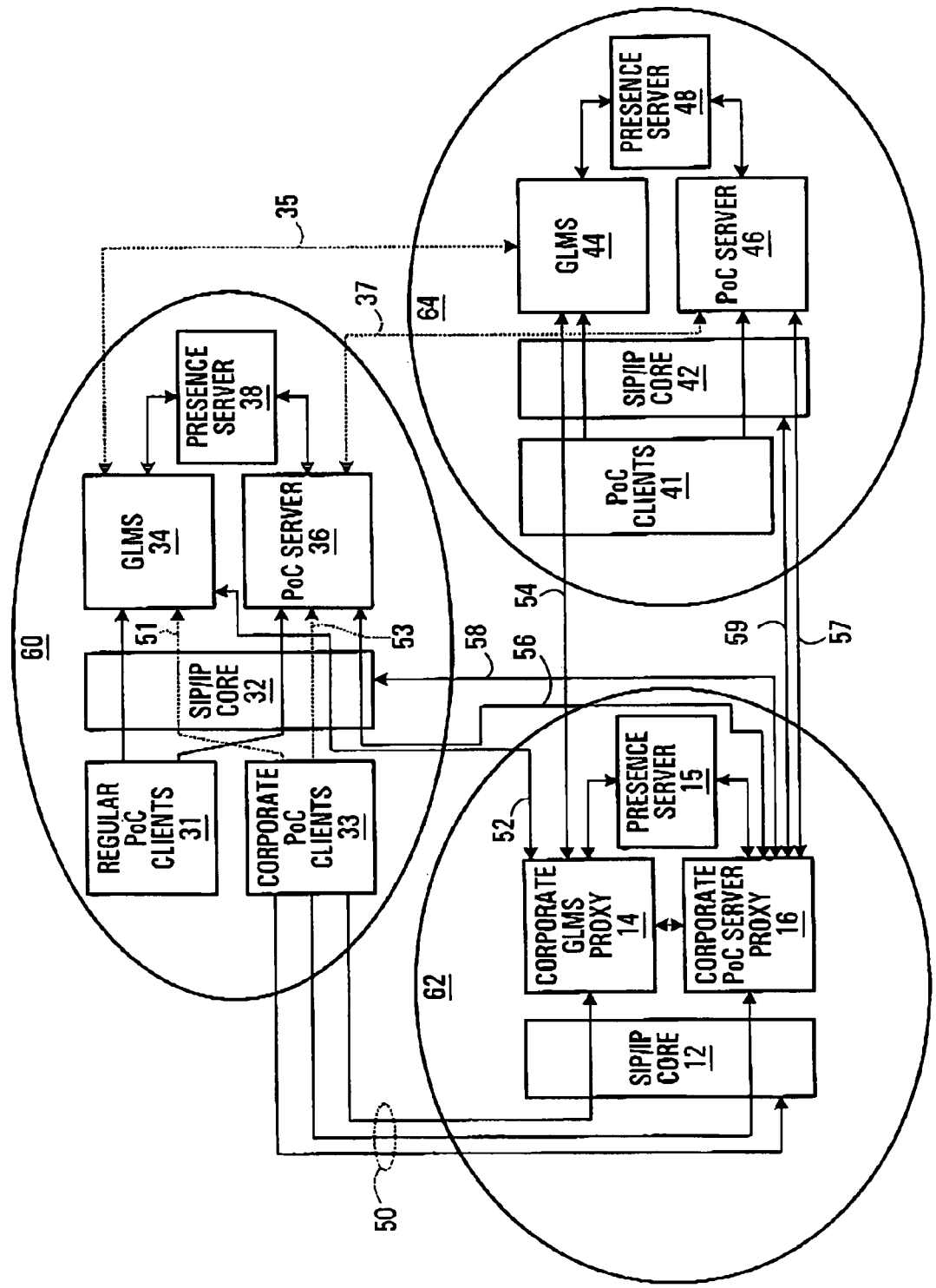
FIG. 8 is a detailed block diagram of an example system for providing PoC by bridging network carriers.

Turning now to FIG. 8, shown is a detailed illustration of an example of an implementation specific to PoC that links private or corporate half-duplex or PoC components with network carriers' PoC components. In the example that follows, it is assumed that the private network is a corporate network. However, the architecture disclosed can be applied to any organization. It is to be understood that embodiments that employ PoC for instant communications are not all limited to the detailed example of FIG. 8.

In FIG. 8 the infrastructure generally indicated by 60 is associated with carrier network A, and infrastructure generally indicated by 62 is associated with carrier network B. More generally, there may be one or more carrier networks. Also shown is infrastructure 64 associated with the corporation. There may be such infrastructure for each of a plurality of private organizations. Carrier A and Carrier B have respective GLMS 34,44, PoC servers 36, 46, and presence servers 38,48, as well as SIP/IP Cores 32, 42. Regular PoC client devices 31 are shown on network A, as are corporate PoC clients 33. PoC clients 41 are shown in network B, this representing regular and/or corporate clients. Corporate clients on network B are connected to the corporate PoC in the same manner as the corporate clients on network A although the details are not shown. The dashed line 51 between corporate PoC clients 33 and the carrier GLMS 34 and the dashed line 53 between corporate PoC clients 33 and the carrier PoC server 36 depict the possibility of allowing dual identities for corporate users—corporate and/or regular identities. The access networks are not shown in FIG. 8 so as to simplify the figure.

The corporate infrastructure 64 has a corporate SIP/IP core 12, a corporate GLMS proxy 14, a corporate PoC server proxy 16 and corporate presence server 15. A corporate firewall (not shown) may be provided around corporate infrastructure 64.

For corporate POC users using their corporate identities, all communications are routed to the corporate infrastructure 64 as indicated at 50. This might take place over fixed dedicated or virtual connections between the carrier network and the corporate network for example. Preferably, the corporate PoC server 16 uses standard interfaces 56,57 to communicate with the carrier's PoC servers 36,46 respectively and standard interfaces 58,59 to communicate with SIP/IP Core 32,42 respectively. Similarly, preferably the corporate GLMS 14 uses standard interfaces 52,54 to communicate with the carrier's GLMS 34, 44.

All corporate users' signals are routed through to the corporate network where they are appropriately combined and routed back to the carrier networks as required. When the above described methods are implemented in the system of FIG. 8, a so-called generic user is presented to the PoC server 36 in the form of a "virtual PoC client" via interface 56 such that from the carrier's perspective, there is no difference between a regular PoC client 31 or a corporate proxy generated generic PoC client. Similarly, a virtual PoC client is presented to the PoC server 46 via interface 57 such that from the carrier's perspective, there is no difference between a regular PoC client 41 or a corporate proxy generated generic PoC client.

The real individual user identities behind a generic PoC client are invisible to the network GLMS 34, 44 and PoC server(s) 36, 46. This allows greater privacy when creating PoC Sessions and inviting large groups to chat sessions. Optionally, if demanded by the network carrier, the actual number of participants behind a corporate generic PoC client could be provided to the carrier-based PoC Servers 36, 46 for billing purposes.

Preferably, a corporate user 33 under a carrier can use his/her corporate PoC identity or his/her regular PoC subscriber identity for his/her PoC sessions. If the corporate identity and regular PoC subscriber identity are allowed to be used at the same time, preferably the user device is not permitted to release the corporate information to regular PoC users.

Because all corporate users signals are processed at the corporate PoC server, there is a flexibility to provide further enhanced features to corporate users. For example, in one implementation, a "private chat" option is available to corporate users by muting the signals sent to the regular users.

USE CASE EXAMPLES

Various use case examples will now be presented in the context of a company having 2000 employees, with some of the employees using Carrier A as wireless service provider, while others use Carrier B as wireless service provider. The corporate PoC 16 and GLMS 14 servers pre-register a pool of 60 PoC service accounts with names of c1A@mycompany.com through c60A@mycompany.com with carrier A, and similarly register 60 PoC service accounts with names of c1B@mycompany.com through c60B@mycompany.com with carrier B. With these PoC service accounts, the corporate PoC and GLMS servers can support up to 60 simultaneous PoC sessions if each of the PoC sessions bridges both Carrier A and Carrier B, or support up to 120 simultaneous PoC sessions if each session only involves one carrier, for the sessions involves both corporate users and regular carrier PoC subscribers. Each of the PoC service accounts may support one or many corporate users under a carrier (Carrier A or B). The mapping between real corporate users and the PoC service accounts is dynamically assigned on a per session basis. If there are multiple corporate users under a carrier in a session, all the involved users of this session share a single PoC service account, and their voices are combined by the corporate PoC server 16.

USE CASE 1

One Carrier Only, Mix of Corporate Users and Regular PoC Service Subscribers 31 of Same Carrier, Corporate User Invite Regular User(s)

Three corporate employees under Carrier A want to conduct a POC session with a regular PoC service subscriber of Carrier A. The corporate PoC and GLMS servers use a pre-registered PoC service account at Carrier A—c1A@mycompany.com to complete the PoC session. Corporate GLMS 14 and PoC server 16 are configured to include the three corporate employees in the single PoC service account c1A@mycompany.com. A PoC session request from the corporate PoC server is sent to the Carrier A GLMS 34 and PoC 36 server using account c1A@mycompany.com and the regular PoC service subscriber 31 of Carrier A is invited for the PoC session. The Carrier A PoC server 36 may also request the corporate PoC server 16 to update the number of users behind c1A@mycompany.com for this PoC session for billing purpose, however the real identities of the three corporate employees are hidden from the Carrier A network. In some embodiments, the three corporate employees are also able to conduct private chats among themselves using enhanced features and additional security mechanisms supported by the corporate PoC server 16. Note, although Carrier A knows the three corporate users are using the Carrier A access service for data calls, Carrier A does not know they are in this particular PoC session.

USE CASE 2

Two Carriers, Mix of Corporate Users and Regular PoC Service Subscribers of Both Carriers, Corporate User Invite Regular User(s)

Three corporate employees under Carrier A and one corporate employee under Carrier B want to conduct a PoC session with one regular PoC service subscriber of Carrier A (User A) and one regular PoC service subscriber of Carrier B (User B). The corporate PoC 16 and GLMS 14 servers use a pre-registered PoC service account at Carrier A—c1A@mycompany.com and a pre-registered PoC service account at Carrier B—c1B@mycompany.com to complete the cross carrier PoC session. Corporate GLMS 14 and PoC 16 servers are configured to include the three corporate employees under Carrier A coverage and one corporate employee under Carrier B coverage in the single PoC service account c1A@mycompany.com to work with Carrier A in the PoC session; similarly corporate GLMS 14 and PoC 16 servers are configured to include the three corporate employees under Carrier A coverage and one corporate employee under Carrier B coverage in the single PoC service account c1B@mycompany.com to work with Carrier B. A PoC session request from the corporate PoC 16 server is sent to the Carrier A GLMS 34 and PoC 36 server using account c1A@mycompany.com to invite the User A into the PoC session; similarly, a PoC session request from the corporate PoC server 16 is sent to the Carrier B GLMS 44 and PoC 46 server using account c1B@mycompany.com to invite the User B into the PoC session. Upon accepting the invitation by User A, the voice of User A is also combined by the corporate PoC server 16 and sent to User B using the PoC service account c1B@mycompany.com; similarly, upon accepting the invitation by User B, the voice of User B is also combined by the corporate PoC server 16 and sent to User A using the PoC service account c1A@mycompany.com. The Carrier A PoC server 36 may also request the corporate PoC server 16 to update the number of users behind c1A@mycompany.com for this PoC session for billing purpose (either in total or in categories), however the real identities of the four corporate employees and the User B are hidden from the Carrier A network; similarly, the Carrier B PoC server 46 may also request the corporate PoC server to update the number of users behind c1B@mycompany.com, again the real identities of the four corporate employees and the User A are hidden from the Carrier B network. For this PoC session, the four corporate employees are also able to conduct private chats among themselves using enhanced features and additional security mechanisms supported by the corporate PoC server 16.

USE CASE 3

One Carrier Only, Mix of Corporate Users and Regular PoC Service Subscribers of Same Carrier, a Regular User Invites a Corporate User, and the Invited Corporate User Further Invites a Group of Corporate Users A regular PoC service subscriber of Carrier A (User A) invites a corporate user User C into a PoC session. User C is a corporate user who also subscribes regular PoC service in Carrier A. User A may have been in an on-going PoC session that involves a group of users at the time he/she invites User C to join. User C wants to further invite three additional corporate employees into the on-going session. User C sends the request to corporate PoC 16 and GLMS 14 servers (based on IP addresses, and using his/her corporate identity, such as a PIN) to have the three additional corporate users setup. The corporate PoC 16 and GLMS 14 servers select an available PoC service account from the pool of pre-registered accounts at Carrier A, say, c1A@mycompany.com and maps the three additional employees to this account, and inform the handset of User C. The handset of User C then invites c1A@mycompany.com into the on-going session, in the same way as inviting a regular PoC service subscriber, and preferably the invitation to c1A@mycompany.com is performed automatically by the handset without any user intervention. User C now can choose to remain as a regular user of Carrier A in the session, or use his/her corporate privilege to join the c1A@mycompany.com as a corporate user in the session while still keeping his/her regular identity in the session. In the latter case, User C can participate in private chats with the other 3 corporate users using his/her corporate identity. He/she can choose to listen to both conversations in the private chat and the regular group, or only listen to the private chat. If choosing to listen to both, the voices from two data traffic streams are combined at the handset. He/she can also talk to the non-corporate users using his/her regular identity while the other corporate users are in private chat, meanwhile monitors the private chat. He/she can also talk to the entire group (both corporate or non-corporate users) either using his regular identity or use his/her corporate identity. To reduce redundant traffic, while there is no corporate private chat, preferably the corporate PoC server 16 does not send voice data stream to (the corporate identity of) User C, and User C only receives the voice stream from Carrier A POC server (which includes that coming from c1A@mycompany.com). As in previous use cases, corporate GLMS 14 and PoC server 16 are configured to hide the corporate employees behind the single PoC service account c1A@mycompany.com. The Carrier A PoC server 36 may also request the corporate PoC server 16 to update the number of users behind c1A@mycompany.com for this PoC session for billing purpose, however the real identities of the three corporate employees are hidden from the Carrier A network. For this PoC session, the corporate employees under c1A@mycompany.com are also able to use other enhanced features and additional security mechanisms supported by the corporate PoC server. Note, although Carrier A knows the three additional corporate users are using their access service for data calls, Carrier A does not know they are in this particular PoC session. Carrier A only knows User C is in the session as a regular user.

USE CASE 4

Two Carriers, Mix of Corporate Users and Regular PoC Service Subscribers of Both Carriers, a Regular User of Carrier A Invites a Corporate User, and the Invited Corporate User Further Invites a Group Corporate Users, and Regular User(s) at Carrier B A regular PoC service subscriber 31 of Carrier A (User A) invites a corporate user User C into a PoC session. User C is a corporate user who also subscribes regular PoC service in Carrier A. User A may have been in an on-going PoC session that involves a group of users at the time he/she invites User C to join. User C wants to further invite three additional corporate employees, and one regular user under Carrier B into the on-going session. User C sends the request to corporate PoC 16 and GLMS 14 servers (based on IP addresses, and using his/her corporate identity, such as a PIN) to have the three additional corporate users and the one regular user under Carrier B setup. The corporate PoC 16 and GLMS 14 servers select an available PoC service account from the pool of pre-registered accounts at Carrier A, say, c1A@mycompany.com and map the requested corporate users to this account to work with Carrier A, and also select an available PoC service account from the pool of pre-registered accounts at Carrier B, say, c1B@mycompany.com and map the requested corporate users to this account to work with Carrier B. The corporate PoC 16 and GLMS 14 servers inform the handset of User C to use the assigned c1A@mycompany.com for this session. The handset of User C then invites c1A@mycompany.com into the on-going session, in the same way as inviting a regular PoC service subscriber, and preferably the invitation to c1A mycompany.com is performed automatically by the handset without any user intervention. The corporate PoC server 16 in turn sends an invitation to user B under Carrier B in the name of c1B@mycompany.com. The cross carrier PoC call is now setup successfully. User C now can choose to remain as a regular user of Carrier A in the session, or use his/her corporate privilege to join the c1A@mycompany.com as a corporate user in the session while still keeping his/her regular identity in the session. In the latter case, User C can participate private chats with the other 3 corporate users using his/her corporate identity, and can also talk to the non-corporate users under Carrier A using his/her regular identity while the other corporate users are in private chat, meanwhile monitors the private chat. He/she can also talk to the entire group (both corporate or non-corporate users) either using his regular identity or use his/her corporate identity. To reduce redundant traffic, while there is no corporate private chat, the corporate PoC server 16 does not send voice data stream to (the corporate identity of) User C, and User C only receives the voice stream from Carrier A PoC server 36 (which includes that coming from c1A@mycompany.com). The corporate PoC server 16 combines the voices of the corporate users, and the voices of the regular users under Carrier A (received from c1A@mycompany.com), and sends to Carrier B PoC server 46 using the service account c1B@mycompany.com for Carrier B's participating users; similarly, corporate PoC server combines the voices of the corporate users, and the voices of the regular users under Carrier B (received from c1B@mycompany.com), and sends to Carrier A using the service account c1A@mycompany.com for Carrier A's participating users. As in previous use cases, the Carrier A PoC server 36 may request the corporate PoC server 16 to update the number of users behind c1A@mycompany.com for this PoC session for billing purpose (either in total or in categories), however the real identities of the corporate users and the users under Carrier B are hidden from the Carrier A network; similarly, the Carrier B PoC server 46 may also request the corporate PoC server 16 to update the number of users behind c1B@mycompany.com (either in total or in categories) for billing purpose, again the real identities of the corporate users and the participating users under Carrier A are hidden from the Carrier B network. For this PoC session, the corporate employees are also able to use other enhanced features and additional security mechanisms supported by the corporate PoC server 16.

In some embodiments, the PoC Server and GLMS at one carrier can generate a generic client identity to the PoC Servers and GLMS of other carriers during a cross carrier PoC session as shown in dashed line 35 between carrier GLMSs 34,44 and dashed line 37 between carrier PoC servers 36,46. In addition to the information of a normal PoC client, a generic PoC client may also confess the number of participants behind the generic client for billing purpose.

This architecture adds flexibility to the corporate PoC and GLMS servers and therefore the corporation can implement whatever feature enhancements within its jurisdiction, for instance, extra security measurements, private chat while in the middle of a PoC session, etc.

The above-described embodiments of the present application are intended to be examples only. Those of skill in the art may effect alterations, modifications and variations to the particular embodiments without departing from the scope of the application.

We claim:

1. A private instant communications processing element configured for connection ma private network and for use in conjunction with a first public land mobile network, the first public land mobile network providing wireless access to a first plurality of wireless user devices, the first plurality of wireless user devices comprising a first group of private wireless user devices operable in the first public land mobile network which is configured to route signals from the first group of private wireless user devices to the private instant communications processing element connected in the private network, the private instant communications processing element being configured to:
   receive, via the first public land mobile network, in the private instant communications processing element of the private network, instant communications signals from devices in the first group of private wireless user devices;
   perform instant communications signal processing on the received instant communications signals by producing a combined signal which includes the received instant communication signals from the devices in the first group of private wireless user devices;
   transmit, via the first public land mobile network, from the private instant communications processing element of the private network, the combined signal of the received instant communications signals to a PoC (push-to-talk over cellular) server in the first public land mobile network in association with a generic identifier, such that the combined signal is treated as coming from a single wireless user device; and
   wherein the instant communications signals are PoC (Push-to-talk over cellular) voice signals.

2. The private instant communications processing element of claim 1 further configured to:
   assign the generic identifier for the first group of private wireless user devices to be included in the instant communications session.

3. The private instant communications processing element of claim 2, wherein the identities of the private wireless user devices are hidden from the PoC server.

4. The private instant communications processing element of claim 1 for use in further conjunction with a second public land mobile network, the second public land mobile network providing wireless access to a second plurality of wireless user devices, the second plurality of wireless user devices comprising a second group of private wireless user devices operating in the second public land mobile network which is configured to route signals from the second group of private wireless user devices to the private instant communications processing element connected in the private network, wherein the private instant communications processing element is further configured to: receive, via the second public land mobile network, signals from devices in the second group of private wireless user device; and perform instant communications processing on signals received from the devices in the first group of private wireless user devices and the second group of private wireless user devices, produce instant communications signals for transmission to the first group of private wireless user devices, and produce instant communications signals for transmission to the second group of private wireless user devices.

5. The private instant communications processing element of claim 4 where the first plurality of wireless user devices comprises at least one first regular wireless user device, and the second plurality of wireless user devices comprises at least one second regular wireless user device, the private instant communications processing element being further configured to:
   assign a first generic user identifier appearing as a single user within a first instant communications session established by the first public land mobile network, and assign a second generic user identifier appearing as a single user within a second instant communications session established by the second public land mobile network;
   combine second regular wireless user device signals and first and second private wireless user device signals into a first combined signal, and send the first combined signal to a carrier instant communications processing element of the first public land mobile network for submission to first regular wireless user devices via the first public land mobile network using the first generic identifier;
   combine first regular user device signals and first and second private user device signals into a second combined signal, and send the second combined signal to a carrier instant communications processing element of the second public land mobile network for submission to second regular user devices via the second public land mobile network using the second generic identifier; and
   combine signals from the carrier instant communications processing element of the first public land mobile network and the carrier instant communications processing element of the second public land mobile network into a third combined signal, and send the third combined signal to first private user devices via the first network and to the second private user devices via the second network.

6. The private instant communications processing element of claim 1 further configured to provide an indication of a number of participants behind the generic identifier to a carrier instant communications processing element of the first public land mobile network for billing.

7. The private instant communications processing element of claim 1 wherein the private network is communicatively coupled to, but separate and apart from, the first public land mobile network.

8. The private instant communications processing element of claim 1 comprising a GLMS (group list management server), a presence server and a PoC server which are configured for connection in the private network.

9. The private instant communications processing element of claim 8 wherein the GLMS, the presence server and the PoC server are configured for connection in the private network for communication via the first public land mobile network through standard interfaces.

10. A system comprising a first public land mobile network configured to provide wireless access to regular wireless user devices and private wireless user devices, and comprising a first CICP (carrier instant communications processing element) configured to deliver an instant communications with respect to a plurality of input signals, the system further comprising:

a PICP (private instant communications processing element) configured to connect in a private network, receive and include signals from a first group of private wireless user devices which are accessing the private network via the first public land mobile network into a first combined signal, and communicate the first combined signal as one input to an instant communications session delivered by the first CICP in association with a first generic identifier, such that the first combined signal is treated as coming from a single wireless user device; and wherein the instant communications comprises PoC (push-to-talk over cellular) voice communications.

11. The system of claim 10 further comprising a second public land mobile network configured to provide wireless access to regular wireless user devices and private wireless user devices, and comprising a second CICP (carrier instant communications processing element) configured to deliver instant communications with respect to a plurality of input signals, the system further comprising:

the PICP (private instant communications processing element) being further configured to receive and include signals from a second group of private wireless user devices into a second combined signal and communicate the second combined signal as one input to an instant communications session delivered by the second CICP in association with a second generic identifier, such that the second combined signal is treated as coming from a single wireless user device.

12. The system of claim 10 configured to set up an instant communications session by:

the PICP receiving a request from the first group of private wireless user devices containing a user identification and containing invitees comprising other private users and/or regular users;

sending the invitation to the invited private network users via the first public land mobile network;

receiving acceptances or rejections of the invitation and adding users to a list of users for the session;

assigning the first generic identifier for the private users on the session;

sending an invitation to regular invitees via the carrier instant communications processing element containing the first generic identifier and identifiers of the regular invitees; and the carrier instant communications processing element establishing an instant communications session including the first generic identifier and the regular invitees that accepted the invitation.

13. The system of claim 12 configured to set up an instant communications session by:

receiving a request for instant communications, the request comprising an identifier of a user device making the request, and containing invitees comprising a combination of one or more of private users on A (the first public land mobile network), regular users on A, private users on B (the second public land mobile network B), and regular users on B;

the PICP assigning a first generic identifier to the first public land mobile network and a second generic identifier to the second public land mobile network;

the PICP sending the invitation to the private users on A and B via appropriate public land mobile network, receiving the private users acceptances/rejections and adding users to each generic ID accordingly;

the PICP sending an invitation to any regular users on A through the CICP of A using the first generic ID;

the PICP sending an invitation to any regular users on B through the CICP of B using the second generic ID;

the CICP of network A establishing an instant communications session between the regular users on A and a single generic identifier user having the first generic identifier; and the CICP of network B establishing an instant communications session between regular users on B and a single generic ID user having the second generic identifier.

14. The system of claim 10 configured to set up an instant communications session by:

receiving a request from one of the private user devices containing a user identification and containing invitees comprising other private users;

sending the invitation to the invited private network users via the public land mobile network; and receiving acceptances or rejections of the invitation and adding users to a list of users for the session.

15. A wireless user device associated with a private network and having wireless access via a public land mobile network, the wireless user device comprising:

a regular instant communications client configured to participate in carrier network delivered instant communications sessions delivered by the public land mobile network;

a private instant communications client configured to participate in instant communications sessions, via the public land mobile network, in which session communications from the wireless user device which is accessing the private network via the public land mobile network are routed through a private instant communications processing element connected in the private network, and included with session communications from other wireless user devices associated with the private network in a combined signal associated with a generic identifier, such that the combined signal is treated in the instant communication sessions as coming from a single wireless user device; and wherein the instant communications comprises Push-to-talk over Cellular (PoC) voice communications.

16. The wireless user device of claim 15 wherein the regular instant communications client is a first push-to-talk over cellular client of the wireless user device, and the private instant communications client is a second push-to-talk over cellular client of the wireless user device.

17. The wireless user device of claim 15 wherein the private instant communications client is further configured to refrain from releasing, to the public land mobile network, private information related to the communication sessions in which the private instant communications client participates while the regular instant communications client also concurrently participates in a communication session.

18. A computer readable medium having processor executable instructions stored thereon for execution by a wireless user device which is associated with a private network, and comprising:

a regular instant communications client configured to participate in carrier network delivered instant communications sessions delivered by a public land mobile network;

a private instant communications client configured to participate in instant communications sessions, via the public land mobile network, in which voice communications from the wireless user device which is accessing the private network via the public land mobile network are routed through a private instant communications processing element connected in the private network, and included with voice communications from other wireless user devices associated with the private network in a combined signal associated with a generic identifier, such that the combined signal is treated in the instant communication sessions as coming from a single wireless user device; and wherein the instant communication sessions comprise Push-to-talk over Cellular (PoC) communication sessions.

19. The computer readable medium of claim 18 wherein the regular instant communications client is a first push-to-talk over cellular client, and the private instant communications client is a second push-to-talk over cellular client.

20. A system for use in providing a PoC communication session including private wireless user devices associated with a private network and regular user devices, in which voice signals of the private wireless user devices which are accessing the private network via a public land mobile network are routed through a private network server of the private network and processed by the private network server in a combined signal associated with a generic identifier, where the combined signal is communicated in the PoC communication session in association with the generic identifier for hiding identities of the private wireless user devices in the PoC communication session.

* * * * *